United States Patent
Lider et al.

(10) Patent No.: US 10,038,614 B1
(45) Date of Patent: Jul. 31, 2018

(54) CLASSIFYING SOCIAL NETWORK USERS

(71) Applicant: Google Inc., Mountain View, CA (US)

(72) Inventors: Brett Rolston Lider, San Francisco, CA (US); Austin N Chang, San Francisco, CA (US); Michael Harry Lintz, San Francisco, CA (US); Kathleen Ko, San Francisco, CA (US)

(73) Assignee: Google LLC, Mountain View, CA (US)

( * ) Notice: Subject to any disclaimer, the term of this patent is extended or adjusted under 35 U.S.C. 154(b) by 209 days.

(21) Appl. No.: 14/144,313

(22) Filed: Dec. 30, 2013

Related U.S. Application Data (60) Provisional application No. 61/747,773, filed on Dec. 31, 2012.

(51) Int. Cl.
*G06F 15/173* (2006.01)
*H04L 12/26* (2006.01)

(52) U.S. Cl.
CPC .................. *H04L 43/0876* (2013.01)

(58) Field of Classification Search
CPC ....... H04L 67/22; H04L 51/32; H04L 67/104; H04L 67/306; H04L 51/24; H04L 65/1093; G06F 17/3053; G06F 17/30828; G06Q 50/01
See application file for complete search history.

(56) References Cited

U.S. PATENT DOCUMENTS

| | | | | |
|---|---|---|---|---|
| 8,943,154 B1* | 1/2015 | Bodell | .................. | G06F 15/16 709/206 |
| 9,092,485 B2* | 7/2015 | Rubinstein | ........ | G06F 17/30528 |
| 2010/0318571 A1* | 12/2010 | Pearlman | .............. | H04L 63/104 709/225 |
| 2011/0208814 A1* | 8/2011 | Bostrom | ................ | G06Q 10/10 709/204 |
| 2012/0179972 A1* | 7/2012 | Hacid | ............... | G06F 17/30899 715/738 |
| 2012/0236103 A1* | 9/2012 | Cahill | .................. | G06Q 10/101 348/14.01 |
| 2013/0268377 A1* | 10/2013 | Jessup | ................ | G06Q 30/0605 705/14.73 |
| 2013/0325948 A1* | 12/2013 | Chen | ...................... | G06Q 50/01 709/204 |
| 2014/0114774 A1* | 4/2014 | Schultz | ................. | G06Q 10/10 709/204 |

\* cited by examiner

*Primary Examiner* — Liangche A Wang
*Assistant Examiner* — Ayele Woldemariam
(74) *Attorney, Agent, or Firm* — McDermott Will & Emery LLP (57) ABSTRACT

A method for selecting a user interface to be provided to one or more users of a social network, the method including steps for receiving edge information, wherein the edge information includes an indication of a number of social networking contacts with which a first user has connected in a social network, receiving frequency information, wherein the frequency information includes a number of times that the first user has interacted with the social network over a time duration and associating the first user with a first segment from among a plurality of segments, based on the edge information and the frequency information. In certain aspects, the method may further include steps for providing the first user with a first user interface, based on the first user's association with the first segment. Systems and computer-readable media are also provided.

19 Claims, 4 Drawing Sheets

CLASSIFYING SOCIAL NETWORK USERS

CROSS-REFERENCE TO RELATED APPLICATIONS

The present application claims the benefit of priority under 35 U.S.C. § 119 from U.S. Provisional Patent Application Ser. No. 61/747,773, filed on Dec. 31, 2012, the disclosure of which is hereby incorporated by reference in its entirety for all purposes.

BACKGROUND

The subject application relates to the classification of users, and in particular the classification of social networking users into various groups or segments.

SUMMARY

The disclosed subject matter relates to a computer-implemented method for selecting a user interface to be provided to one or more users of a social network, comprising, receiving edge information, wherein the edge information includes an indication of a number of social networking contacts with which a first user has connected in a social network, receiving frequency information, wherein the frequency information includes a number of times that the first user has interacted with the social network over a time duration and associating the first user with a first segment from among a plurality of segments, based on the edge information and the frequency information. In certain aspects, the method further includes steps for providing the first user with a first user interface, based on the first user's association with the first segment.

In some implementations, the edge information can include a number of user contacts with which the first user is connected in the social network and/or a number of non-user contacts with which the first user is connected in the social network. Additionally, in some implementations, the edge information may include a number of reciprocal connections formed between the first user and one or more social networking contacts.

Furthermore, in certain aspects, the frequency information may include a number of times that the first user has logged into the social network within the time duration and/or an indication of one or more communication channels used by the first user to access the social network. In certain aspects, email notifications can be provided to the first user based on the first user's association with the first segment. Additionally, in certain aspects, contact recommendations may be provided to the first user based on the first user's association with the first segment.

In some aspects, methods of the subject technology may further include steps for receiving edge information for a second user, receiving frequency information for the second user, associating the second user with a second segment from among the plurality of segments, based on the edge information and the frequency information for the second user and providing the second user with a second user interface, based on the second user's association with the second segment.

The disclosed subject matter also relates to a system for selecting a user interface to be provided to one or more users of a social network, the system including one or more processors; and a computer-readable medium comprising instructions stored therein, which when executed by the processors, cause the processors to perform operations including, receiving edge information including an indication of a number of user contacts with which the first user is connected in the social network receiving frequency information, wherein the frequency information includes a number of times that the first user has interacted with the social network over a time duration and associating the first user with a first segment from among a plurality of segments, based on the edge information and the frequency information. In certain aspects, the processors may be configured to perform operations including providing the first user with a first user interface, based on the first user's association with the first segment.

In some aspects, the edge information may include a number of non-user contacts with which the first user is connected in the social network. In yet another aspect, the edge information may include a number of reciprocal connections formed between the first user and one or more social networking contacts.

In certain implementations, the frequency information comprises a number of times that the first user has logged into the social network within the time duration and/or an indication of one or more communication channels used by the first user to access the social network. In yet another aspect, email notifications may be provided to the first user based on the first user's association with the first segment. Furthermore, in certain aspects, contact recommendations may be provided to the first user based on the first user's association with the first segment.

The disclosed subject matter also relates to a computer-readable medium comprising instructions stored therein, which when executed by a processor, cause the processor to perform operations including, receiving edge information including an indication of a number of user contacts and a number of non-user contacts with which the first user is connected in the social network, receiving frequency information, wherein the frequency information includes a number of times that the first user has interacted with the social network over a time duration and associating the first user with a first segment from among a plurality of segments, based on the edge information and the frequency information. In certain aspects, the processor may be further configured to perform operations for providing the first user with a first user interface, based on the first user's association with the first segment.

In certain aspects, the edge information may include a number of user contacts with which the first user is connected in the social network. In yet another aspect, the edge information may include a number of non-user contacts with which the first user is connected in the social network. Additionally, the edge information may include a number of reciprocal connections formed between the first user and one or more social networking contacts.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

Users of social networking services can create associations with one another to form a "social network." The terms "social network" and "social networking service" as used herein can encompass its plain and ordinary meaning, including, but not limited to, an online service, platform, network or site that focuses on building and reflecting social associations among different users or contacts. These associations may be stored within a social graph at each social networking site. Such associations may be defined on a user-to-user basis, or as a group of users associated through membership within a group. As used herein, the terms "contact," "social networking contact," and "user associate" refer to other users with whom a particular user may be associated.

Figure 1:
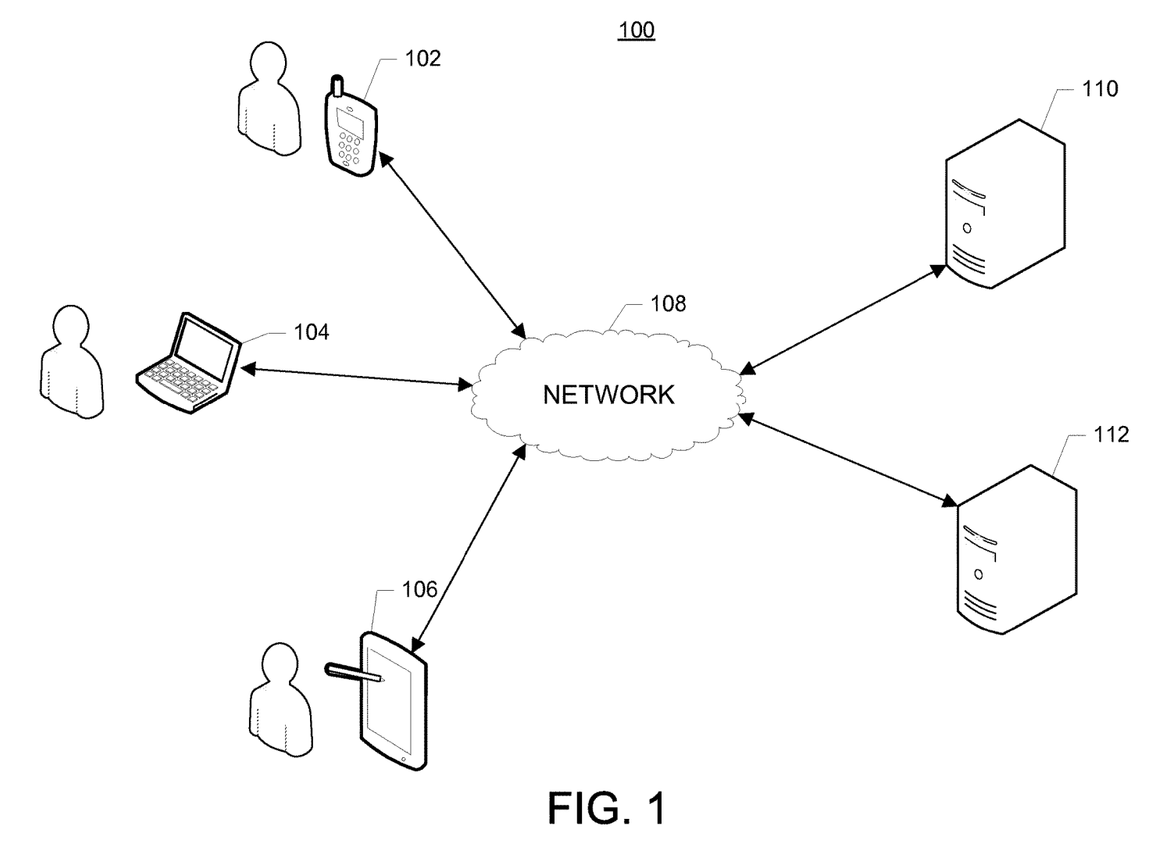
FIG. 1 illustrates an example network system that can be used to implement certain aspects of the subject technology.

FIG. 1 illustrates an example network system 100 that can be used to implement certain aspects of the subject technology. As illustrated, network system 100 includes network 108, first server 110 and second server 112. In certain aspects, network system 100 may be used to host and/or provide a social network to one or more users, such as one or more users associated with user devices 102, 104 and/or 106. In certain implementations, one or more users can create "social groups" (e.g., social circles) including one or more contacts to organize his/her associations. The social groups may be additionally used to control distribution of messages and content to contacts of the user. For example, "social circles" are categories to which a user can assign their social networking contacts and better control the distribution and visibility of social networking messages as well as other multimedia content (e.g., documents, and other collaboration objects). In accordance with the subject disclosure, a social circle is provided as a data set defining a collection of contacts that are associated with one another. In some aspects, a social circle can be described from the perspective of an individual that is the center of a collection of socially interconnected people, or from the aggregate perspective of a collection of socially interconnected people.

In some examples, a social circle can have narrowly defined boundaries, all of the members of the social circle may be familiar with one another, and permission may be required for a member to join a social circle. In accordance with the subject disclosure, a user of an electronic device may define a social circle, and the social circle, as a data set defining a collection of contacts, may reflect a real-life social circle of the user.

The disclosed subject matter provides a way to classify users of a social network into various segments, wherein each segment is associated with a different set of user interface (UI) settings or features with respect to the social network.

In particular, the instant disclosure provides a way to classify social networking users into different segments based on various characteristics, such as a number of social networking contacts (e.g., a number of "edges") and a frequency of social network use (e.g., a "frequency"). The segment associated with a user can then be used to provide the user with a specific user experience.

As used herein, a number of edges (e.g., "edge information") can encompass various types of information about social networking contacts with whom a user is connected. In certain aspects, edge information may include a number of user contacts with which the first user is connected in the social network. In other aspects, edge information may include a number of non-user contacts with which the first user is connected in the social network, such as, organizations, businesses, clubs and/or interest groups, etc. Furthermore, in some implementations, edge information can include a number of reciprocal connections formed between the first user and one or more social networking contacts.

As used herein, "frequency information" can encompass various types of information indicating a rate or frequency of interaction with a social network, for example, by a user or a group of users. In certain aspects, frequency information may include an indication of a number of times that a first user has logged into a social network, for example, within a predetermined time duration. In other aspects, the frequency information may include an indication of one or more communication channels used by the first user to access the social network.

Although certain examples provided herein can describe a user's information (e.g., edge information and/or frequency information, etc.) being stored in memory, the user can delete the user information from memory and/or opt out of having the user information stored in memory. In example aspects, the user can adjust appropriate privacy settings to selectively limit the types of user information stored in memory, or select the memory in which the user information is stored (e.g., locally on the user's device as opposed to remotely on a server). In example aspects, the user information does not include and/or share the specific identification of the user (e.g., the user's name) unless otherwise specifically provided or directed by the user.

Asymmetric social networks allow users to unilaterally connect with or follow one another without requiring consent or reciprocation from other users. For example, in an asymmetric social network a first user may connect with or follow a multitude of other user's or contacts (such as businesses or organizations) that are not connected with or following the first user. As such, users of an asymmetric social network can have a different number of contacts or "edges" representing a number of connections made from a particular user to all other contacts in the social network.

Because the health of a social network is dependent on the continued engagement of users with the social network (as well as with one another), it is important to encourage users to use the social network and to interact with others. Users can be encouraged to participate in the social networking community by providing targeted enhancements to the user experience, for example, by encouraging users to log into the social network or to connect with or follow other potential friends, colleagues or acquaintances.

The subject technology provides a way to provide targeted enhancements to different users based on a respective segment in which they have been associated.

By way of example, a first user having a relatively few number of edges but a high frequency of engagement may be associated with a first segment, corresponding with a group of users that are frequently provided with contact recommendations. In contrast, a second user having a large number of edges and a low frequency of engagement may be associated with a second segment, corresponding with a group of users that are provided with reminders to visit the social network in order to view content posted by established contacts.

Although the characteristics of a number of edges and frequency may be used to classify users into various segments, other characteristics may be used in different aspects of the subject technology. For example, in some implementations users may be classified into segments based on reciprocity rates, e.g., the rate at which other users reciprocally connect with a particular user. In certain aspects, the classification into segments can be based on the types of users with which a particular user is connected, for example, by comparing a number of celebrity contacts to non-celebrity contacts.

Additionally, the segment associated with a particular user (and therefore the user experience delivered to that user) may change as the user's characteristics change. For example, a user associated with a first segment and having a low number of edges may become connected with a large number of other users. As such, the user may be re-associated, for example, with a second segment corresponding with a different user experience.

As illustrated with respect to FIG. 1, each of the user devices (e.g., user devices 102, 104 and 106) are communicatively connect to first server 110 and second server 112, via network 108. It is understood that in addition to user devices 102, 104 and 106, first server 110 and second server 112, any number of other processor-based devices could be communicatively coupled to network 108. Furthermore, network 108 could include multiple public and/or private networks, such as a network of networks, e.g., the Internet.

In certain aspects, a social network platform (e.g., an asymmetrical social network) can be hosted and provided to one or more users associated with any of user devices 102, 104 and/or 106 using first server 110 and/or second server 112.

Additionally, one or more of first server 110 and second server 112 can be configured to receive information relating to use of the social network by one or more users. For example, first server 110 can be configured to receive edge information and/or frequency information for one or more users, such as one or more users associated with user devices 102, 104 and/or 106. Subsequently, users associated with user devices 102, 104 and/or 106 can be categorized into (e.g., associated with) one or more segments. As will be described in further detail below, the segment associated with a user can be used to deliver a specific user interface and/or to deliver certain types of notifications to the user. In certain aspects, users associated with different segments (e.g., based on edge information and/or frequency information) will be provided with different user interfaces (UIs) and/or provided with different communications from the social network.

By way of example, a first user associated with user device 102 may have a small number of contacts within the social network and may rarely log into or visit the social network. As such, edge information for the first user may indicate that the first user has few contacts within the social network. Similarly, frequency information for the first user may indicate that the first user rarely visits or checks into the social network. Based on the edge information and frequency information for the first user, the first user may be classified (e.g., by first server 110 and/or second server 112) into a first segment (e.g., "Segment 1").

In another example, a second user associated with user device 104 may also have few contacts within the social network, but may frequently visit the social network, for example, to read news or view information for one or more of the second user's contacts. As such, edge information for the second user may indicate that the second user has relatively few contacts, however, frequency information for the second user may indicate that the second user frequently visits the social network. Based on the edge information and the frequency information, the second user may be classified (e.g., by the first server 110 and/or the second server 112) into a second user segment (e.g., "Segment 2").

In another example, a third user that is also associated with user device 104 may have a large number of contacts, such as a large number of other users or contacts such as business or interest groups whom he/she is following. However, despite the large number of contacts, the third user may not visit the social networking site frequently. As such, edge information for the third user may indicate that the third user has a large relative number of contacts; however, the frequency information for the third user may indicate that the third user rarely visits the social networking service. Based on the edge information and frequency information for the third user, the third user may be classified into a third user segment (e.g., "Segment 3").

In yet another example, a fourth user that is associated with user device 106 may have a large number of contacts and may visit the social network relatively frequently. As such, edge information for the third user may indicate that the third user has a large number of edges or connections within the social network. Similarly, frequency information for the third user may indicate that the third user frequently visits the social networking service. Based on edge information and frequency information for the third user, the third user may be classified into a fourth user segment (e.g., "Segment 4").

Subsequently, each of the first user, second user, third user and fourth user may be provided with different UIs and/or notifications (e.g., email notifications) based on their respective association with each of the first segment, second segment, third segment and fourth segment. For example, the second user may be provided with a greater number of contact recommendations, as compared to the third user. Similarly, the third user may be provided with more frequent reminders, such as email notifications, prompting the third user to log into or engage with the social network.

Figure 2:
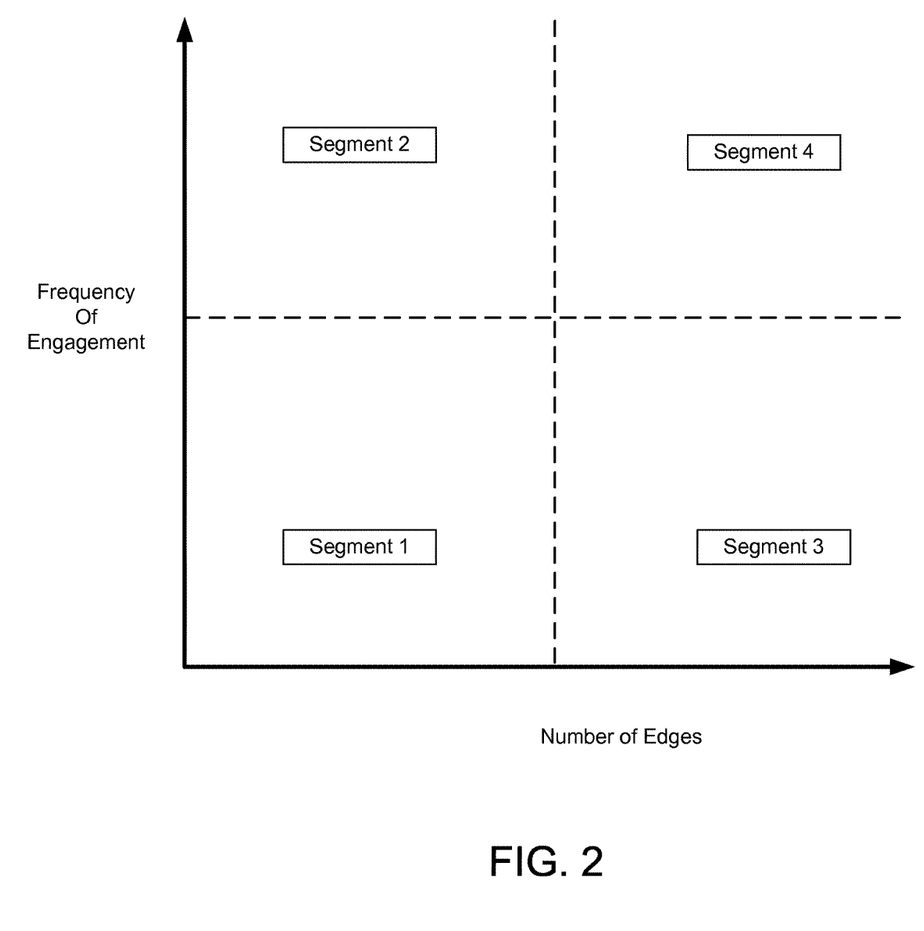
FIG. 2 conceptually illustrates a relationship between segment associations and edge information and frequency information, according to some aspects of the subject disclosure.

FIG. 2 conceptually illustrates a relationship between segment associations and edge information and frequency information, according to some aspects of the subject disclosure. It should be understood that a greater number (or fewer number) of segments may be defined by available edge information and/or frequency information for one or more users. Furthermore, in some implementations, additional types of information may be used to define one or more segments.

The illustration of FIG. 2 depicts four different segments, e.g., Segment 1, Segment 2, Segment 3 and Segment 4. For example, Segment 1 is shown to correspond with a region associated with a low frequency of engagement and a low number of edges. Segment 2 corresponds with a region associated with a high frequency of engagement and a low number of edges. Segment 3 corresponds with a region associated with a low frequency of engagement and a high number of edges; and Segment 4 corresponds with a region associated with a high frequency of engagement and a high number of edges.

As discussed above, information relating to a frequency of engagement and a number of edges for a user can be used to classify the user into a particular segment, such as one of the four segments illustrated in FIG. 2. The user's classification into a particular segment can then be used to provide a user with a particular experience with respect to the social network. For example, a user may be provided with different communications based on his/her association with a particular segment. In some aspects, a user may be provided with a particular user interface or configuration when interacting with the social network, for example, when the user is logged into his/her social network account.

Figure 3:
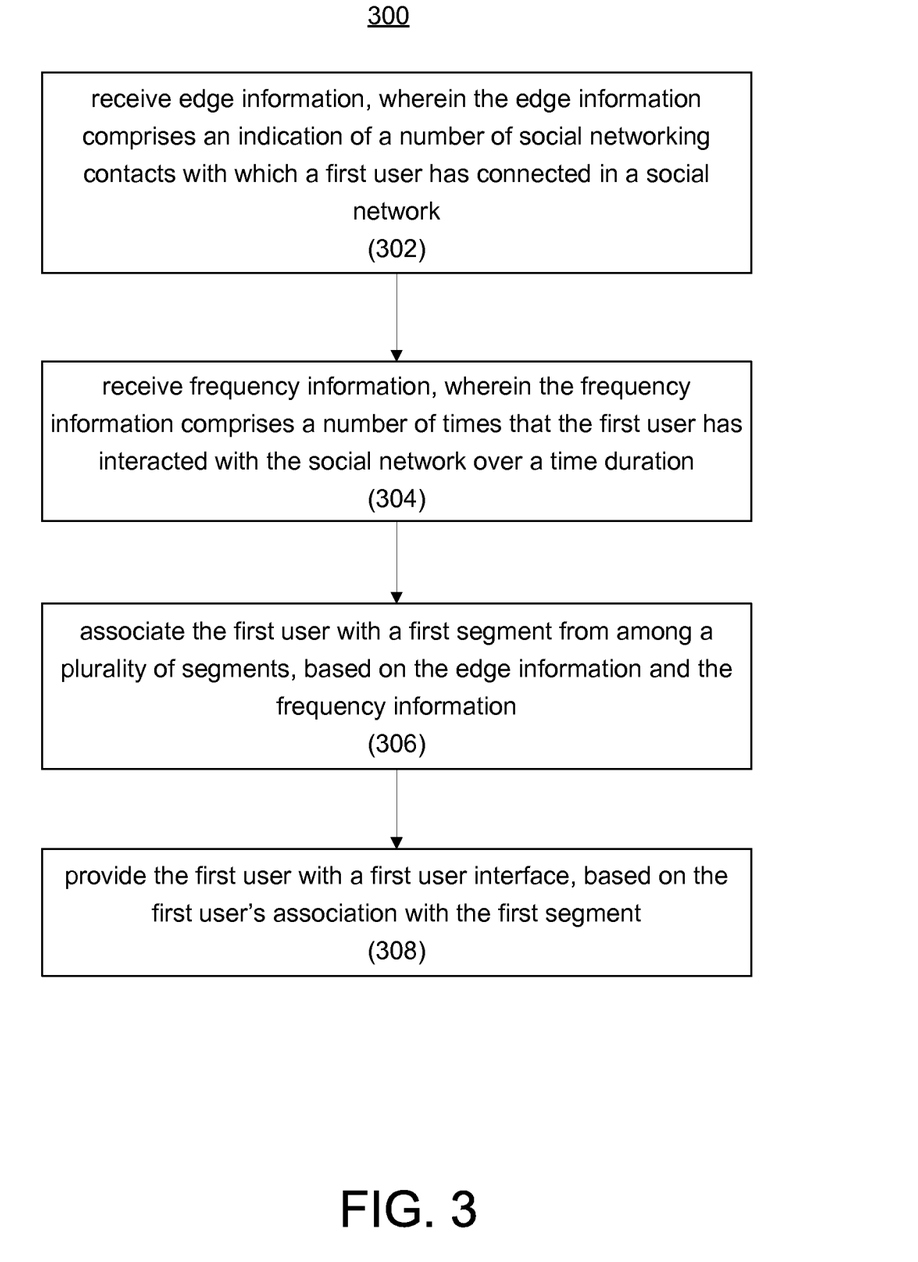
FIG. 3 conceptually illustrates an example method for selecting a user interface to be provided to one or more users of a social network, according to some aspects of the subject disclosure.

FIG. 3 conceptually illustrates an example method 300 for selecting a user interface to be provided to one or more users of a social network. Method 300 begins with step 302 in which edge information is received (e.g., using one or more computing devices), for a first user, wherein the edge information comprises an indication of a number of social networking contacts with which the first user has connected in a social network.

Various types of connections between the first user and one or more contacts in the social network may contribute to the edge information. For example, the first user's connections with other individuals or users in the social network may be counted. Furthermore, the first user's connections with non-human contacts, such as businesses or organizations may be counted in the edge information.

In certain aspects, the edge information may include information identifying the type of connections formed by the first user in the social network. By way of example, edge information may include information relating to they type of contacts with which the first user is connected (e.g., other users or businesses/organizations). Additionally, edge information may include information about user contacts of the first user, for example, the celebrity status of a user with whom the first user has connected.

In step 304, frequency information will be received (e.g., using one or more computing devices), wherein the frequency information comprises a number of times that the first user has interacted with the social network over a time duration. In certain aspects, the frequency information can represent a measure of the first user's frequency of interaction with the social network, such as a number of times that the first user logged into or interacted with content of the social network over a duration of time.

In certain aspects, frequency information may include information indicating they types of communication channels used by the first user to access the social network. For example, frequency information may include an indication of whether the user accessed the social network from a mobile device, such as a mobile phone, smart phone or tablet computing device. Additionally frequency information can include an indication as to the location and/or time that the user logged into the social network.

In step 306, the first user is associated with a first segment from among a plurality of segments, based on the edge information and the frequency information received in steps 302 and 304, respectively.

By way of example, the first user may be associated with any one of the four segments discussed above with respect to FIG. 2. Because the edge information and frequency information for any user may change as the user continues to interact with the social network, a user's association with a particular segment may change. For example, a user may be associated with Segment 1, as described above. However, as the user continues to interact with the social network and form more connections within the network, the user's edge information may change significantly. As such, if the user's edge information indicates that the user has become connected with a relatively large number of other users in the social network, the user's association with Segment 1 may be re-evaluated. For example, based on the user's association with a relatively large number of contacts in the social network, the user may be associated with Segment 3.

In step 308, the first user will be provided with a first user interface, based on the first user's association with the first segment. By way of example, a user (e.g., the first user) may be associated with Segment 3, based on edge information indicating that the first user has a relatively large number of contacts in the social network and further based on frequency information indicating that the first user has a relatively low frequency of engagement with the social network. Due to the first user's association with Segment 3, the first user interface provided to the first user may be configured to provide the first user with information or alerts that encourage the first user to log into and/or engage with the social network, for example, to increase the first user's frequency of engagement with the social network.

Figure 4:
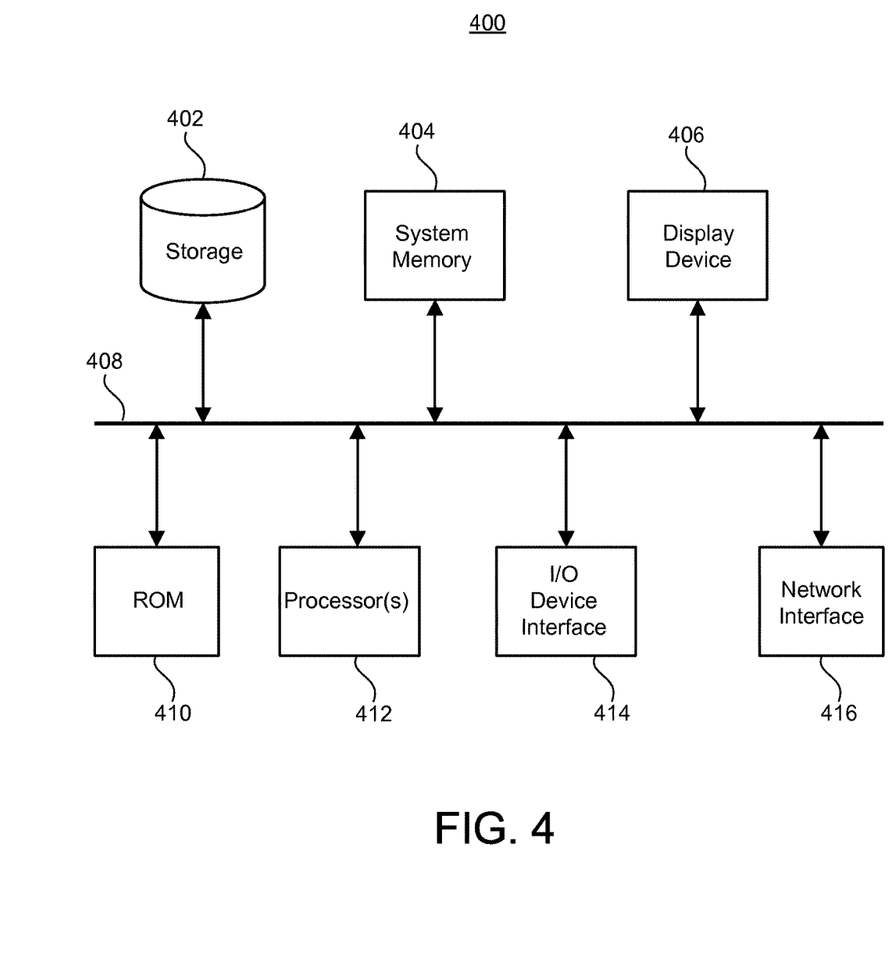
FIG. 4 illustrates an example of an electronic system with which some aspects of the subject technology can be implemented.

FIG. 4 illustrates an example of an electronic system 400 with which some aspects of the subject technology can be implemented. In some examples, electronic system 400 can be a single computing device, such as a server (e.g., first server 110 and/or second server 112, discussed above). Furthermore, in some implementations, electronic system 400 can be operated alone or together with one or more other electronic systems e.g., as part of a cluster or a network of computers.

As illustrated, electronic system 400 comprises storage 402, system memory 404, output device interface 406, system bus 408, ROM 410, processor(s) 412, input device interface 414 and network interface 416. In some aspects, system bus 408 collectively represents all system, peripheral, and chipset buses that communicatively connect the numerous internal devices of electronic system 400. For instance, system bus 408 communicatively connects processor(s) 412 with ROM 410, system memory 404, output device interface 406 and permanent storage device 402.

In some implementations, processor(s) 412 retrieve instructions to execute (and data to process) in order to execute the steps of the subject technology. Processor(s) 412 can be a single processor or a multi-core processor in different implementations. Additionally, processor(s) 412 can comprise one or more graphics processing units (GPUs) and/or one or more decoders, depending on implementation.

ROM 410 stores static data and instructions that are needed by processor(s) 412 and other modules of electronic system 400. Similarly, processor(s) 412 can comprise one or more memory locations such as a CPU cache or processor in memory (PIM), etc. Storage device 402, is a read-and-write memory device. In some aspects, this device can be a non-volatile memory unit that stores instructions and data even when electronic system 400 is without power. Some implementations of the subject disclosure can use a mass-storage device (such as solid state, magnetic or optical storage devices) e.g., permanent storage device 402.

Other implementations can use one or more a removable storage devices (e.g., magnetic or solid state drives) such as permanent storage device 402. Although the system memory can be either volatile or non-volatile, in some examples the system memory 404 is a volatile read-and-write memory, such as a random access memory. System memory 404 can store some of the instructions and data that the processor needs at runtime.

In some implementations, the processes of the subject disclosure are stored in system memory 404, permanent storage device 402, ROM 410 and/or one or more memory locations embedded with processor(s) 412. From these various memory units, processor(s) 412 retrieve instructions to execute and data to process in order to execute the processes of some implementations of the instant disclosure.

Bus 408 also connects to the input device interface 414 and output device interface 406. Input device interface 414 enables a user to communicate information and select commands to electronic system 400. Input devices used with input device interface 414 may include for example, alphanumeric keyboards and pointing devices (also called "cursor control devices") and/or wireless devices such as wireless keyboards, wireless pointing devices, etc.

Finally, as shown in FIG. 4, bus 408 also communicatively couples electronic system 400 to a network (not shown) through network interface 416. It should be understood that network interface 416 can be either wired, optical or wireless and may comprise one or more antennas and transceivers. In this manner, electronic system 400 can be a part of a network of computers, such as a local area network ("LAN"), a wide area network ("WAN"), or a network of networks, such as the Internet (e.g., network 108, as discussed above).

In practice, certain methods and/or processes of the subject technology can be carried out by electronic system 400. In some aspects, instructions for performing one or more processes of the present disclosure will be stored on one or more memory devices such as storage 402 and/or system memory 404.

In some examples, electronic system 400 may be used to perform processes for receiving edge information, wherein the edge information includes an indication of a number of social networking contacts with which a first user has connected in a social network, receiving frequency information, wherein the frequency information includes a number of times that the first user has interacted with the social network over a time duration and associating the first user with a first segment from among a plurality of segments, based on the edge information and the frequency information. In certain aspects, electronic system 400 may be further configured to perform operations for providing the first user with a first user interface, based on the first user's association with the first segment.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A method comprising:
   receiving edge information that comprises an indication of a number of social networking contacts with which a first user has connected in a social network, wherein a portion of the number of social networking contacts includes a user contact that the first user has connected to without the user contact following the first user, wherein the first user being connected to the user contact comprises a unilateral connection, wherein the edge information comprises a number of reciprocal connections formed between the first user and one or more social networking contacts;
   receiving frequency information that comprises an indication of a number of times the first user has interacted with the social network over a time duration;
   associating the first user with a first segment from among a plurality of segments, based on the edge information and the frequency information, each segment of the plurality of segments corresponding to one of a plurality of user interface settings of the social network, wherein associating the first user with the first segment is further based on a rate at which other users reciprocally connect with the first user in the social network;
   providing the first user with a first user interface of a plurality of user interfaces to the social network using a respective one of the plurality of user interface settings corresponding to the first segment, based on the association between the first user and the first segment, each of the plurality of user interfaces including a different type of notification from the social network to a respective user for prompting the respective user to interact with the social network,
   wherein each of the plurality of user interfaces includes a different number of notifications from the social network being provided to the first user at a rate corresponding to an associated segment of the plurality of segments;
   receiving updated edge information that comprises a second indication of a second number of social networking contacts with which the first user has connected in the social network, the second number of social networking contacts being greater than the number of social networking contacts;
   receiving updated frequency information that comprises an indication of a number of times the first user has interacted with the social network over a second time duration;
   removing the association between the first user and the first segment;
   associating the first user with a second segment from among the plurality of segments based on the updated edge information and the updated frequency information indicating that the first user has a low frequency of engagement with the social network based on the number of times that the first user has interacted with the social network over the second time duration; and
   providing the first user with a particular user interface to the social network using a respective user interface setting corresponding to the second segment, based on the association between the first user and the second segment, the particular user interface including a notification from the social network for prompting the first user to increase a frequency of engagement with the social network.

2. The method of claim 1, wherein the edge information comprises a number of user contacts with which the first user is connected in the social network.

3. The method of claim 1, wherein the edge information comprises a number of non-user contacts with which the first user is connected in the social network.

4. The method of claim 1, wherein the frequency information comprises an indication of a number of times the first user has logged into the social network within the time duration.

5. The method of claim 1, wherein the frequency information comprises an indication of one or more communication channels used by the first user to access the social network.

6. The method of claim 1,
   wherein the first user interface provides for display email notifications to the first user based on the association between the first user and the first segment.

7. The method of claim 6, further comprising:
providing the first user with a second user interface of the plurality of user interfaces to the social network using a second respective one of the plurality of user interface settings corresponding to the second segment, based on the association between the first user and the second segment.

8. The method of claim 6, wherein the first user interface further provides for display contact recommendations to the first user based on the association between the first user and the first segment.

9. The method of claim 6, further comprising: receiving edge information for a second user;
receiving frequency information for the second user;
associating the second user with a second segment from among the plurality of segments, based on the edge information and the frequency information for the second user; and
providing the second user with a second user interface of the plurality of user interfaces to the social network using a respective one of the plurality of user interface settings corresponding to the second segment, based on the association between the second user and the second segment, the second user interface being different than the first user interface.

10. The method of claim 1, wherein each of the plurality of user interface settings of the social network is associated with a different user interface that provides for display a different type of information relating to the social network.

11. A system for selecting a user interface to be provided to one or more users of a social network, the system comprising:
one or more processors; and
a computer-readable medium comprising instructions stored therein, which when executed by the one or more processors, cause the one or more processors to perform operations comprising:
receiving edge information comprising an indication of a number of user contacts with which a first user is connected in the social network, wherein a portion of the number of user contacts includes a user contact that the first user has connected to without the user contact following the first user, wherein the first user being connected to the user contact represents a unilateral connection, wherein the edge information comprises a number of reciprocal connections formed between the first user and one or more social networking contacts;
receiving frequency information, wherein the frequency information comprises an indication of a number of times the first user has interacted with the social network over a time duration;
associating the first user with a first segment from among a plurality of segments, based on the edge information and the frequency information, each segment of the plurality of segments corresponding to one of a plurality of user interface settings of the social network, wherein associating the first user with the first segment is further based on a rate at which other users reciprocally connect with the first user in the social network;
providing the first user with a first user interface of a plurality of user interfaces to the social network using a respective one of the plurality of user interface settings corresponding to the first segment, based on the association between the first user and the first segment, each of the plurality of user interfaces including a different type of notification from the social network to a respective user for prompting the respective user to interact with the social network, wherein each of the plurality of user interfaces includes a different number of notifications from the social network being provided to the first user at a rate corresponding to an associated segment of the plurality of segments;
receiving updated edge information that comprises a second indication of a second number of user contacts with which the first user has connected in the social network, the second number of user contacts being greater than the number of user contacts;
receiving updated frequency information that comprises an indication of a number of times the first user has interacted with the social network over a second time duration;
removing the association between the first user and the first segment;
associating the first user with a second segment from among the plurality of segments based on the updated edge information and the updated frequency information indicating that the first user has a low frequency of engagement with the social network based on the number of times that the first user has interacted with the social network over the second time duration; and
providing the first user with a particular user interface to the social network using a respective user interface setting corresponding to the second segment, based on the association between the first user and the second segment, the particular user interface including a notification from the social network for prompting the first user to increase a frequency of engagement with the social network.

12. The system of claim 11, wherein the edge information comprises a number of non-user contacts with which the first user is connected in the social network.

13. The system of claim 11, wherein the frequency information comprises an indication of a number of times the first user has logged into the social network within the time duration.

14. The system of claim 11, wherein the frequency information comprises an indication of one or more communication channels used by the first user to access the social network.

15. The system of claim 11,
wherein the first user interface provides for display email notifications to the first user based on the association between the first user and the first segment.

16. The system of claim 15, wherein the first user interface further provides for display contact recommendations to the first user based on the association between the first user and the first segment.

17. A non-transitory computer-readable storage medium comprising instructions stored therein, which when executed by a processor, cause the processor to perform operations comprising:
receiving edge information comprising an indication of a number of user contacts and a number of non-user contacts with which a first user is connected in a social network, wherein a portion of the number of user contacts includes a user contact that the first user has connected to without the user contact following the first user, wherein the first user being connected to the user contact comprises a unilateral connection, wherein the edge information comprises a number of reciprocal connections formed between the first user and one or more social networking contacts;

receiving frequency information, wherein the frequency information comprises an indication of a number of times the first user has interacted with the social network over a time duration;

associating the first user with a first segment from among a plurality of segments, based on the edge information and the frequency information, each segment of the plurality of segments corresponding to one of a plurality of user interface settings of the social network, wherein associating the first user with the first segment is further based on a rate at which other users reciprocally connect with the first user in the social network;

providing the first user with a first user interface of a plurality of user interfaces to the social network using a respective one of the plurality of user interface settings corresponding to the first segment, based on the association between the first user and the first segment, each of the plurality of user interfaces including a different type of notification from the social network to a respective user for prompting the respective user to interact with the social network, wherein each of the plurality of user interfaces includes a different number of notifications from the social network being provided to the first user at a rate corresponding to an associated segment of the plurality of segments;

receiving updated edge information that comprises a second indication of a second number of user contacts with which the first user has connected in the social network, the second number of user contacts being greater than the number of user contacts;

receiving updated frequency information that comprises an indication of a number of times the first user has interacted with the social network over a second time duration;

removing the association between the first user and the first segment;

associating the first user with a second segment from among the plurality of segments based on the updated edge information and the updated frequency information indicating that the first user has a low frequency of engagement with the social network based on the number of times that the first user has interacted with the social network over the second time duration; and providing the first user with a particular user interface to the social network using a respective user interface setting corresponding to the second segment, based on the association between the first user and the second segment, the particular user interface including a notification from the social network for prompting the first user to increase a frequency of engagement with the social network.

18. The non-transitory computer-readable storage medium of claim 17, wherein the edge information comprises a number of user contacts with which the first user is connected in the social network.

19. The non-transitory computer-readable storage medium of claim 17, wherein the edge information further comprises:

a number of non-user contacts with which the first user is connected in the social network.

* * * * *